UNITED STATES PATENT OFFICE.

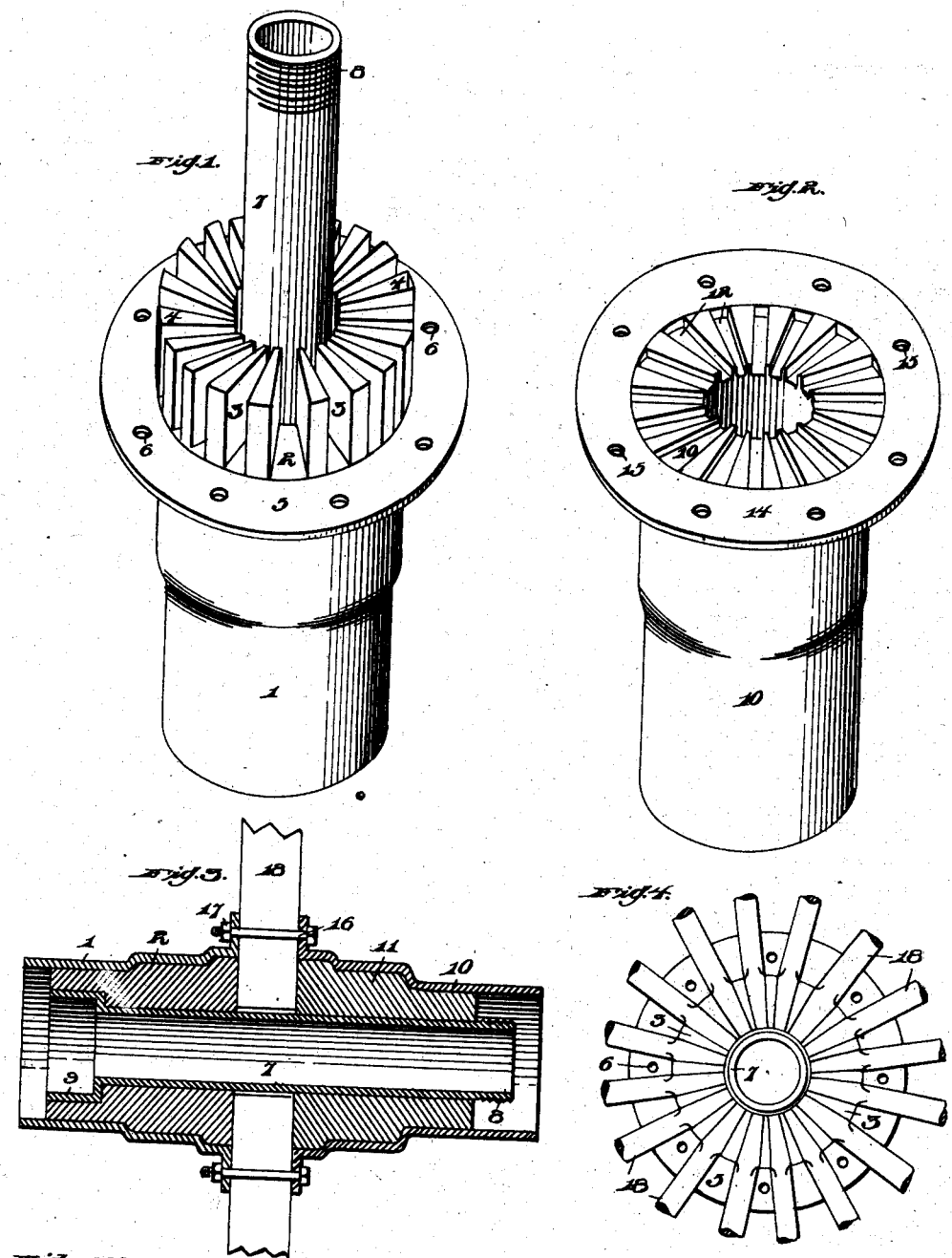

JOHN J. ROWE, OF NEW KENSINGTON, PENNSYLVANIA.

WHEEL.

SPECIFICATION forming part of Letters Patent No. 706,477, dated August 5, 1902.

Application filed September 25, 1901. Serial No. 76,475. (No model.)

*To all whom it may concern:*

Be it known that I, JOHN J. ROWE, a citizen of the United States, residing at New Kensington, in the county of Westmoreland and State of Pennsylvania, have invented a new and useful Improvement in Wheels, of which improvement the following is a specification.

This invention relates to certain new and useful improvements in wheels, and has for its object the provision of novel means whereby a wheel may be easily built up, and in case one or more of the spokes become broken they may be readily removed from the hub and a new spoke inserted in lieu thereof.

Another object of my invention is to construct a device of this character that will be extremely simple in construction, strong, durable, comparatively inexpensive to manufacture, and highly efficient in its use.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a perspective view of a portion of my improved wheel. Fig. 2 is a similar view of the other portion of the wheel. Fig. 3 is a vertical sectional view showing the manner of connecting the spokes. Fig. 4 is a plan view showing one of the sides removed and the spokes in proper position.

In the drawings the reference-numeral 1 indicates a cylindrical casing in which is mounted the hub 2. This hub 2 is formed with a series of notches 3, extending radially from the center outwardly, forming wedge-shaped extensions 4.

The reference-numeral 5 indicates a flange having formed therein a series of openings 6.

The reference-numeral 7 indicates an interior sleeve screw-threaded, as shown at 8, and carrying an enlarged portion 9 at its other end.

The reference-numeral 10 indicates a cylindrical casing, which is likewise provided with a hub portion 11, said hub portion having formed therein a series of seats 12, adapted to receive the wedge-shaped extension 4.

This casing 10 likewise carries a flange 14, in which are formed a series of openings 15, said openings corresponding with the openings 6 of the collar 5 and are adapted to receive fastening means, such as bolts 16, carrying nuts 17.

18 represents a series of spokes which are seated in the notches 3 between the collars 5 and 14.

It will be readily apparent when one spoke is broken or becomes loose it may be easily removed or tightened by means of the bolts and nuts.

The many advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a wheel, a cylindrical casing carrying an annular flange at one end thereof, a hub mounted within said casing, a series of radial wedge-shaped extensions carried by said hub having their ends extending beyond said flange of the casing, an interior sleeve having an enlarged end secured in said hub and extending therebeyond, a second cylindrical casing carrying an annular flange, a hub mounted in said last-named casing and having its end flush with the said last-named flange, said end of the hub having radial wedge-shaped notches formed therein for the reception of said extensions carried by the first-named hub, the said extensions adapted to have the spokes interposed therebetween and have their ends seated in said notches, the said flanges having registering apertures therein and engaging the sides of the spokes, and bolts passed through said flanges and engaging in the space between said spokes, substantially as described.

In testimony whereof I have hereunto signed my name in the presence of two subscribing witnesses.

JOHN J. ROWE.

In presence of—
ROBERT NEZINSKIE,
M. J. MCGEARY.